US011893704B2

(12) United States Patent
Noh et al.

(10) Patent No.: US 11,893,704 B2
(45) Date of Patent: Feb. 6, 2024

(54) IMAGE PROCESSING METHOD AND DEVICE THEREFOR

(71) Applicant: KOREA ADVANCED INSTITUTE OF SCIENCE AND TECHNOLOGY, Daejeon (KR)

(72) Inventors: Junyong Noh, Daejeon (KR); Hanui Lee, Daejeon (KR); Bumki Kim, Daejeon (KR); Gukho Kim, Daejeon (KR); Julie Alfonsine E. Lelong, Daejeon (KR); Mohammad Reza Karimi Dastjerdi, Daejeon (KR); Allen Kim, Daejeon (KR); Jiwon Lee, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 363 days.

(21) Appl. No.: 17/429,254

(22) PCT Filed: Feb. 21, 2019

(86) PCT No.: PCT/KR2019/002123
§ 371 (c)(1),
(2) Date: Aug. 6, 2021

(87) PCT Pub. No.: WO2020/171258
PCT Pub. Date: Aug. 27, 2020

(65) Prior Publication Data
US 2022/0101488 A1 Mar. 31, 2022

(51) Int. Cl.
*G06T 3/20* (2006.01)
*G06T 7/73* (2017.01)
(Continued)

(52) U.S. Cl.
CPC ............... *G06T 3/20* (2013.01); *G06F 18/22* (2023.01); *G06F 18/253* (2023.01); *G06T 7/11* (2017.01);
(Continued)

(58) Field of Classification Search
CPC ..... G06T 3/20; G06T 7/11; G06T 7/74; G06T 2207/10016; G06T 2207/10024;
(Continued)

(56) References Cited

U.S. PATENT DOCUMENTS

2011/0103644 A1* 5/2011 Garten .................. H04N 5/144
382/103
2014/0254882 A1* 9/2014 Jin .......................... G06T 7/215
382/107
(Continued)

FOREIGN PATENT DOCUMENTS

JP 2015-233212 A 12/2015
KR 10-2005-0008246 A 1/2005
(Continued)

OTHER PUBLICATIONS

International Search Report dated Nov. 27, 20219, issued in PCT Application No. PCT/KR2019/002123, filed Feb. 21, 2019.
(Continued)

*Primary Examiner* — Christopher M Brandt
(74) *Attorney, Agent, or Firm* — Workman Nydegger

(57) ABSTRACT

An image processing device according to one embodiment estimates optical flow information, pixel by pixel, on the basis of a reference image and input images of consecutive frames, and estimates a term corresponding to temporal consistency between the frames of the input images. The image processing device determines a mesh on the basis of the term corresponding to temporal consistency and the optical flow information, and transforms the reference image (Continued)

on the basis of the mesh. The image processing device preforms image blending on the basis of the input image, the transformed reference image, and mask data.

20 Claims, 5 Drawing Sheets

(51) Int. Cl.
*G06T 7/11* (2017.01)
*G06V 10/44* (2022.01)
*G06V 10/75* (2022.01)
*G06V 10/62* (2022.01)
*G06F 18/22* (2023.01)
*G06F 18/25* (2023.01)

(52) U.S. Cl.
CPC .............. *G06T 7/74* (2017.01); *G06V 10/443* (2022.01); *G06V 10/62* (2022.01); *G06V 10/751* (2022.01); *G06T 2207/10016* (2013.01); *G06T 2207/10024* (2013.01); *G06T 2207/20092* (2013.01); *G06T 2207/20221* (2013.01)

(58) Field of Classification Search
CPC . G06T 2207/20092; G06T 2207/20221; G06T 3/4038; G06T 5/005; G06T 3/0056; G06T 5/50; G06T 7/277; G06F 18/22; G06F 18/253; G06V 10/443; G06V 10/62; G06V 10/751; G06V 10/754
See application file for complete search history.

(56) References Cited

U.S. PATENT DOCUMENTS

2017/0295359 A1* 10/2017 Cabral ................. H04N 13/156
2018/0005039 A1* 1/2018 Jachalsky ................. G06T 7/33

FOREIGN PATENT DOCUMENTS

| KR | 10-2011-0074128 A | 6/2011 |
| KR | 2015-0101856 A | 9/2015 |
| KR | 10-1697520 B1 | 2/2017 |
| KR | 10-2018-0119696 A | 11/2018 |

OTHER PUBLICATIONS

Written Opinion dated Nov. 27, 20219, issued in PCT Application No. PCT/KR2019/002123, filed Feb. 21, 2019.
Binbin Xu et al., *Optical Flow-Based Video Completion in Spherical Image Sequences*, IEEE Transactions on Circuits and Systems for Video Technology, Dec. 3, 2016, pp. 1-8.
Yue-Yun Deng et al., *Moving Obstacle Removal via Low Rank Decomposition*, 2016, 6th International Conference on Digital Home, pp. 1-6.

* cited by examiner

IMAGE PROCESSING METHOD AND DEVICE THEREFOR

TECHNICAL FIELD

Example embodiments relate to an image processing method and device, and more particularly, to a method of removing an object in an image in a spherical coordinate system based on an optimized mesh deformation using reference image data information.

BACKGROUND ART

The recent advent of various 360-degree (°) panorama virtual reality (VR) cameras has facilitated the capturing and production of 360° panorama videos. However, such panoramic capturing may be performed by capturing an image omnidirectionally at 360° one time, and thus capturing staff and/or equipment may inevitably be included in a captured image. Thus, a correction may be required after the capturing.

DISCLOSURE OF INVENTION

Technical Solutions

An aspect provides an image processing device that provides a user input tool to enable the selection and tracking of an object, thereby reducing the time to be used for editing a panorama image and reducing related costs.

According to an example embodiment, there is provided an image processing method including receiving an input image of sequential frames, receiving a reference image corresponding to the input image, estimating pixel-wise optical flow information based on the input image and the reference image, estimating a term corresponding to temporal consistency between the frames of the input image, determining a mesh based on the term corresponding to the temporal consistency and the optical flow information, transforming the reference image based on the mesh, and performing image blending based on the input image, the transformed reference image, and mask data indicating a hole included in the frames of the input image.

The determining of the mesh may include determining positions of target points of the mesh from a combination of the term corresponding to the temporal consistency and the optical flow information, based on a first weight of the term corresponding to the temporal consistency and a second weight corresponding to the optical flow information.

The term corresponding to the temporal consistency may be determined based on a position of the mesh in a previous frame.

The transforming of the reference image may include obtaining a value of pixels included in the mesh from the reference image based on a geometrical structure of the mesh.

The performing of the image blending may include obtaining a value of a pixel corresponding to the hole from the transformed reference image, and determining a value of a pixel positioned near the hole based on a combination of the input image and the transformed reference image.

The image processing method may further include extracting first feature points from the input image, extracting second feature points from the reference image, and performing preprocessing by matching the first feature points and the second feature points.

The performing of the preprocessing may include removing a rotation between the input image and the reference image based on the result of the matching.

The performing of the preprocessing may include estimating a color difference between the input image and the reference image based on a result of the matching, and the transforming of the reference image may include transforming the reference image based further on the color difference.

The transforming of the reference image based further on the color difference may include determining a value of pixels included in the mesh based on the reference image and the color difference, according to the geometrical structure of the mesh.

The hole may correspond to a region removed from the input image.

The estimating of the optical flow information may include estimating vectors indicating optical flows between pixels included in the input image and reference pixels included in the reference image that correspond to the pixels included in the input image.

The input image may include 360-degree (°) panorama video data.

According to another example embodiment, there is provided an image processing device including a receiver configured to receive an input image of sequential frames and receive a reference image corresponding to the input image, a transformer configured to estimate pixel-wise optical flow information based on the input image and the reference image, estimate a term corresponding to temporal consistency between the frames of the input image, determine a mesh based on the term corresponding the temporal consistency and the optical flow information, and transform the reference image based on the mesh, and an image blender configured to perform image blending based on the input image, the transformed reference image, and mask data indicating a hole included in the frames of the input image.

For the determining of the mesh, the transformer may determine positions of target points of the mesh from a combination of the term corresponding to the temporal consistency and the optical flow information based on a first weight of the term corresponding to the temporal consistency and a second weight corresponding to the optical flow information.

For the transforming of the reference image, the transformer may obtain a value of pixels included in the mesh from the reference image based on a geometrical structure of the mesh.

The image blender may obtain a value of a pixel corresponding to the hole from the transformed reference image, and determine a value of a pixel positioned near the hole based on a combination of the input image and the transformed reference image.

For the estimating of the optical flow information, the transformer may estimate vectors indicating optical flows between pixels included in the input image and reference pixels included in the reference image that correspond to the pixels included in the input image.

The image processing device may further include a preprocessor configured to extract first feature points from the input image, extract second feature points from the reference image, and perform preprocessing by matching the first feature points and the second feature points.

The preprocessor may remove a rotation between the input image and the reference image based on a result of the matching.

The preprocessor may estimate a color difference between the input image and the reference image based on the result of the matching, and the transformer may transform the reference image based further on the color difference

BEST MODE FOR CARRYING OUT INVENTION

Figure 1:
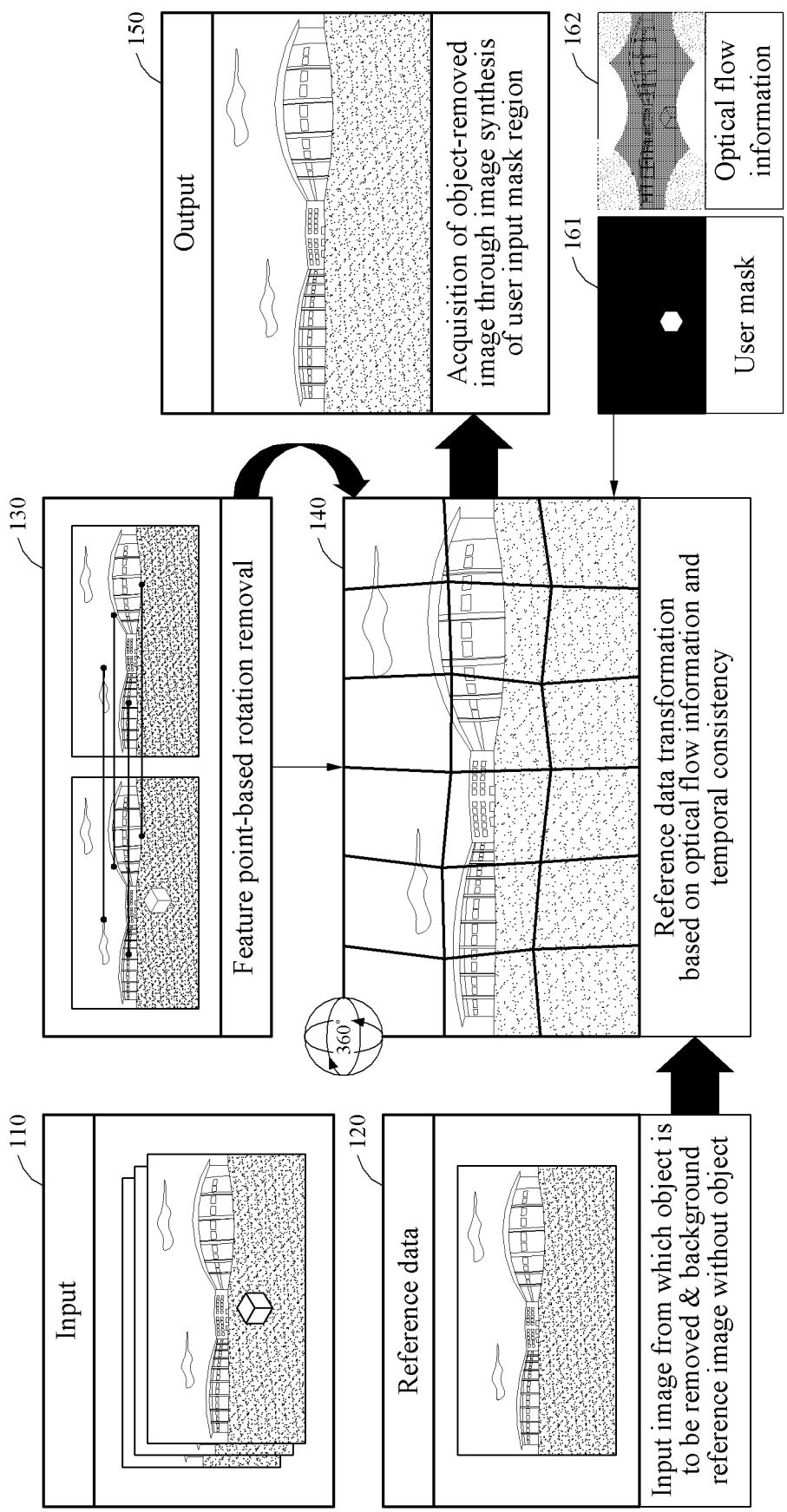
FIG. 1 is a diagram illustrating an example of an image processing method according to an example embodiment.

Hereinafter, some examples will be described in detail with reference to the accompanying drawings. However, various alterations and modifications may be made to the examples. Here, the examples are not construed as limited to the disclosure and should be understood to include all changes, equivalents, and replacements within the idea and the technical scope of the disclosure.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Throughout the specification, when a component is described as being "connected to" or "coupled to" another component, it may be directly "connected to" or "coupled to" the other component, or there may be one or more other components intervening therebetween. In contrast, when an element is described as being "directly connected to" or "directly coupled to" another element, there can be no other elements intervening therebetween.

The terminology used herein is for the purpose of describing particular examples only and is not to be limiting of the examples. As used herein, the singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, example embodiments will be described in detail with reference to the accompanying drawings, and like reference numerals in the drawings refer to like elements throughout.

FIG. 1 is a diagram illustrating an example of an image processing method according to an example embodiment. The image processing method described herein may be performed by an image processing device. The image processing device may be implemented by one or more software modules or one or more hardware modules, or various combinations thereof.

The image processing device may receive input data 110 and reference data 120. The input data 110 may be an image including an object to be removed, and the reference data 120 may be a reference image that does not include therein the object but has a background value of a corresponding position. The image processing device may match feature points of the input data 110 and feature points of the reference data 120 and remove a rotation between the input data 110 and the reference data 120 in operation 130.

The image processing device may transform the refence data 120 based on optical flow information 162 and temporal consistency. A detailed method of transforming the reference data 120 will be described hereinafter. The image processing device may generate an output image 150 from which an object in the input image 110 is removed based on transformed reference data 140 and mask information 161.

A high-quality semiautomatic object removal technology using reference data according to an example embodiment may be performed through the following operations.

1) For an input video from which an object is to be removed, an operation of removing the object using background information included in reference data that is captured at the same location
2) An operation of estimating a rotation value of a camera through image feature point estimation and matching to minimize a difference in viewpoint between an input image and a reference image
3) An operation of minimizing a difference in rotational transformation by inversely applying the estimated rotation matrix
4) An operation of performing a transformation and blending based on optical flow information calculated by applying an image patch of the reference image to a removed region identified by a user input mask
5) An operation of adding an additional term to maintain temporal consistency during an image transformation According to example embodiments described herein, it is possible to remove an object from a high-resolution (e.g., of 4K quality) 360-degree (°) image, with relatively high quality (e.g., 10 or less root-mean-square error (RMSE) of an average accuracy), by applying a two-dimensional (2D) polynomial model estimation using the information of the reference image captured in the same space.

The example embodiments may be applicable to the contents business and may thus contribute to the effective production of virtual reality (VR) contents in terms of the following aspects.

1) In the case of VR capturing devices or equipment, an image of an unnecessary or undesired object may also be captured in a process of capturing an image of a wide field of view (FOV).

2) In such a case, by estimating optical flow information from sequential frame information and applying a 2D polynomial model estimation thereto, reconstruction and removal of a desired object may be performed.

3) The inpainting technology described herein may be a fundamental technology that is employed to increase a degree of freedom (DOF) for editing a panorama image and may thus be highly applicable in a technical manner.

In addition, the example embodiments may contribute to the effective production of multi-view theater-dedicated contents in terms of the following aspects.

1) It is possible to maximize the efficiency of producing content for multi-view screen showing by transforming a 360° panorama image into an immersive content.

2) It is possible to increase the utilization of 360° VR panorama content.

3) It is possible to increase the utilization of content by transforming a general-type content to an immersive content highly efficiently with low costs.

Figure 2:
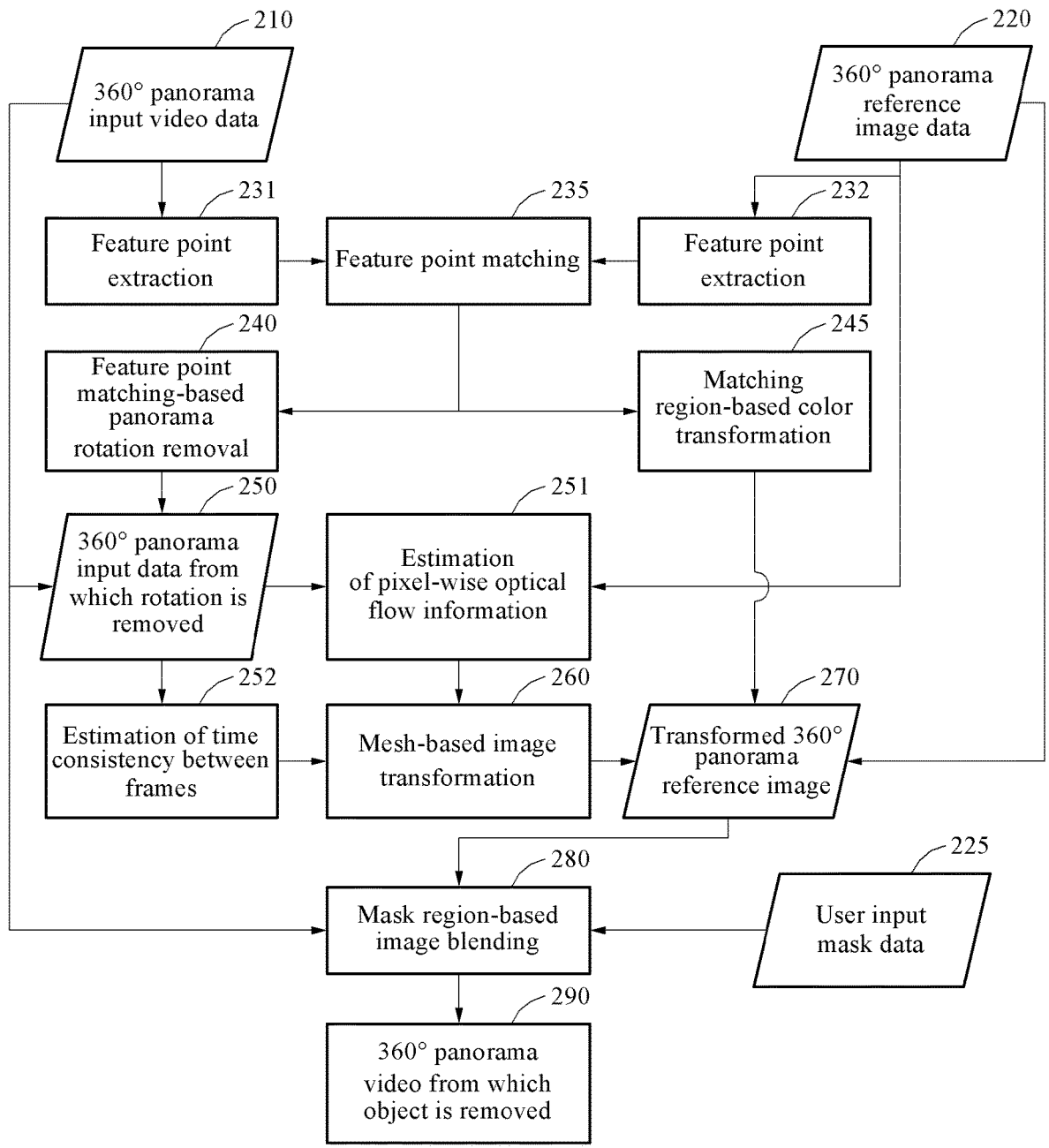
FIG. 2 is a flowchart illustrating an example of an optimized mesh deformation-based spherical coordinate system image inpainting method using reference image data information according to an example embodiment.

FIG. 2 is a flowchart illustrating an example of an optimized mesh deformation-based spherical coordinate system image inpainting method using reference image data information according to an example embodiment.

Referring to FIG. 2, the image processing device may edit a high-quality panorama image through optical flow information-based mesh deformation and optimized combination using information of reference data captured in the same space.

[Input]: The image processing device may receive, as an input, an input 360° panorama video I 210 and a reference image Iref 220 that are in a standard panorama coordinate system. The input video 210 and/or the reference image 220 may be based on a coordinate system for representing a 360° image, for example, a spherical coordinate system with a horizontal rotation in a horizontal direction and a vertical rotation in a vertical direction. The image processing device may receive, as an input, a region of an object to be removed, through a user input mask 225. For example, the user input mask 225 may be readily generated using a Bezier mesh-based user input tool.

[Feature point matching-based panorama rotation removal]: The image processing device may extract feature points of respective data sets to minimize a difference in viewpoint between I and $I_{ref}$ in operations 231 and 232. The image processing device may discover a corresponding relationship between the different data sets by matching the feature points extracted from the respective data sets in operation 235, and obtain a rotation matrix. The image processing device may remove an irregular rotation that occurs when capturing the input data 210 (e.g., a panorama image) to match the reference data 220 using the estimated rotation matrix in operation 240.

Figure 3:
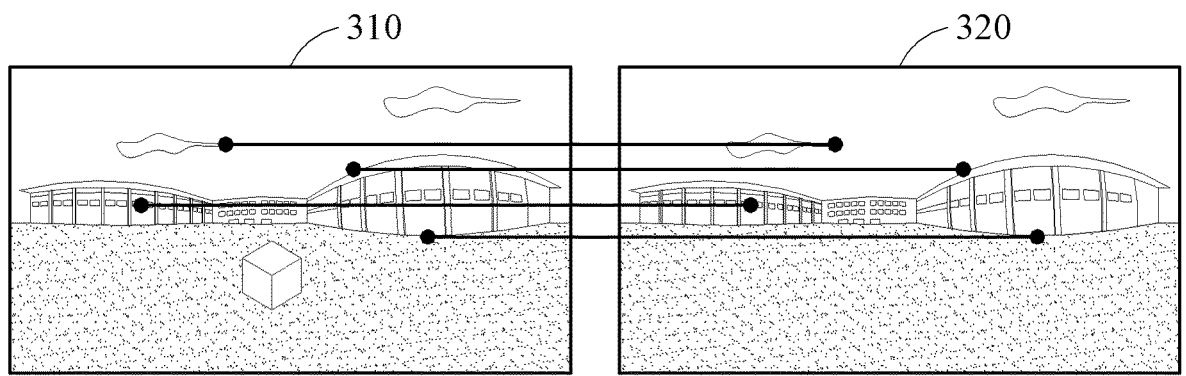
FIG. 3 is a diagram illustrating an example of an image feature point matching-based rotational transformation removal method according to an example embodiment.

FIG. 3 is a diagram illustrating an example of an image feature point matching-based rotational transformation removal method according to an example embodiment. In the example of FIG. 3, illustrated is a process of matching feature points of an input image 310 and feature points of a reference image 320. The image processing device may estimate a rotation matrix between the two images 310 and 320 based on the matched feature points, and rotate the input image 310 using the estimated rotation matrix. Based on a design, the image processing apparatus may also rotate the reference image 320 instead of the input image 310.

[Matching region-based color transformation]: The image processing device may match color information of the different data sets through a color transformation based on a difference between color values of corresponding regions in operation 245. For example, a capturing environment in which the input data 210 is captured may not correspond to a capturing environment in which the reference data 220 is captured. Herein, a capturing environment may include various environmental factors, for example, a capturing time, capturing devices or equipment, settings of an exposure value and the like, the weather or color of the sky when the capturing is performed, and the like. Thus, the input data 210 and the reference data 220 may have a color difference therebetween due to such factors, even though they are captured at the same location. The image processing device may perform a transformation to match the color of the reference data 220 to the color of the input data 210 based on a result of such feature point matching. As an output in operation 245, information indicating how the color of pixels included in the reference data 220 is to be changed may be output.

[Mesh-based image transformation]: The image processing device may estimate pixel-wise optical flow information between input data 250 from which the rotation is removed and the reference data 220 in operation 251. Through this, the image processing device may estimate a difference in geometrical position information between the two data sets 250 and 220. In addition, the image processing device may estimate a temporal term for temporal consistency between frames in operation 252. The image processing device may perform a mesh-based image transformation based on the optical flow information and the temporal term in operation 260.

The optical flow information may include vectors indicating pixel-wise optical flows between the two images. The temporal term may be used as a bias to maintain a mesh structure in a neighboring frame (e.g., a previous frame) in the input data 210. According to an example embodiment, the image processing device may combine a mesh structure that is based on the temporal term and a mesh structure that is based on the optical flow information, based on a weight of the temporal term and a weight of the optical flow information.

Figure 4A:
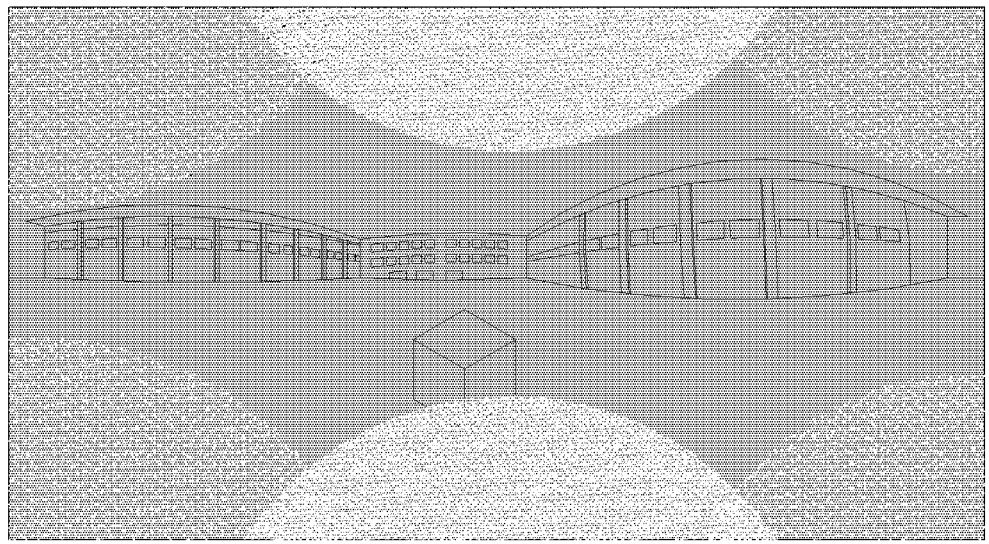
FIG. 4A is a diagram illustrating an example of pixel-wise optical flow information according to an example embodiment.
Figure 4B:
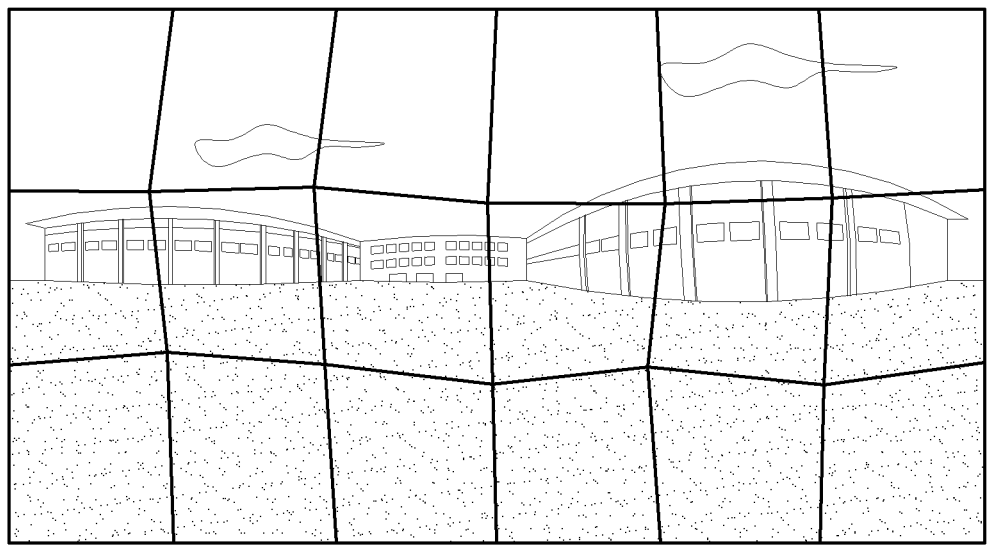
FIG. 4B is a diagram illustrating an example of a mesh-based image transformation using pixel-wise optical flow information according to an example embodiment.

FIG. 4A is a diagram illustrating an example of pixel-wise optical flow information according to an example embodiment. FIG. 4B is a diagram illustrating an example of a mesh-based image transformation using pixel-wise optical flow information according to an example embodiment. According to an example embodiment, the image processing device may determine positions of target points of a mesh of FIG. 4B based on optical flow information of FIG. 4A. By transforming an image by a unit of a mesh, instead of a unit of a pixel, an error-prone characteristic of pixel-unit information may be reduced. In addition, the image processing device may prevent a shake that may occur by a unit of a frame by determining the positions of the target points of the mesh based also on a temporal term.

The image processing device may match geometric information of the two data sets 250 and 220 through the optimized image transformation described above. For example, the image processing device may transform the reference data 220 based on the reference data 220, color transformation information, and mesh information. The image processing device may determine a value of a pixel included in the mesh based on the reference data 220 and the color transformation information according to a mesh structure included in the mesh information.

[Mask region-based image blending]: The image processing device may generate a 360° panorama video 290 with an object removed by blending a transformed reference image in a removed region (e.g., a hole region) identified through the user input mask 225 in operation 280.

Figure 5:
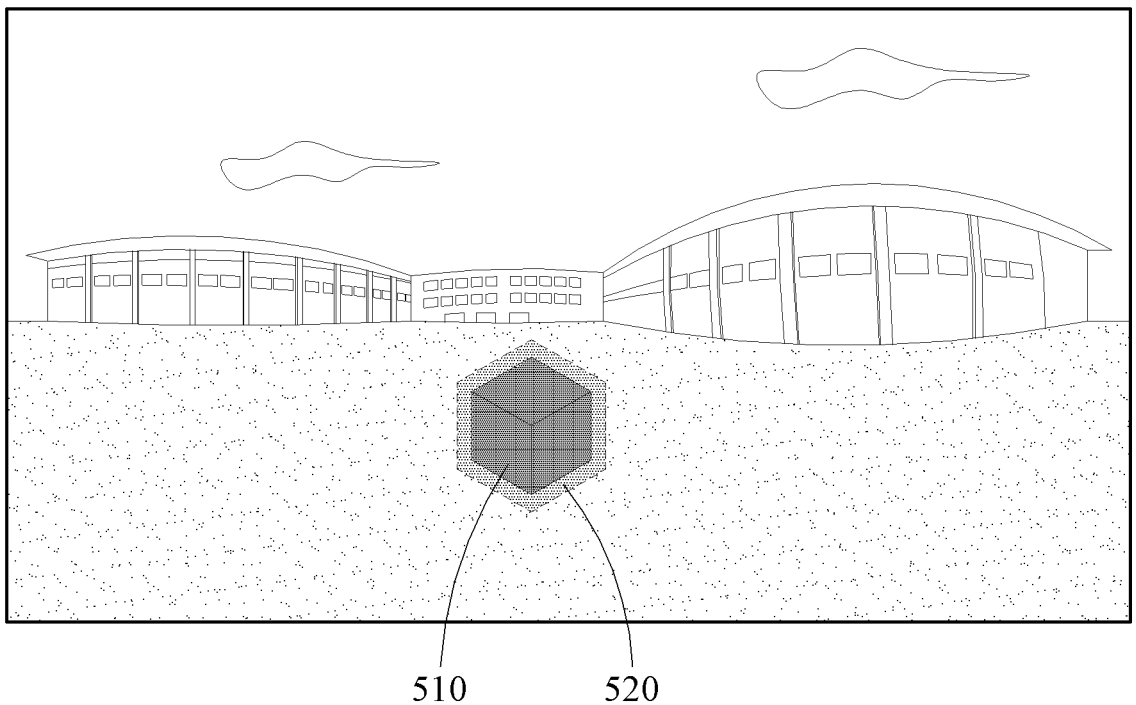
FIG. 5 is a diagram illustrating an example of a mask region-based image blending method according to an example embodiment.

FIG. 5 is a diagram illustrating an example of a mask region-based image blending method according to an example embodiment. Referring to FIG. 5, illustrated are a mask region 510 and a surrounding region 520. The image processing device may determine a value of the mask region 510 based on transformed reference data 270. In addition, when determining a value of the surrounding region 520, the image processing device may use both the input data 210 and the transformed reference data 270, for example, using an average value of the two data sets, to smooth a boundary between a removed object and a surrounding background.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

The invention claimed is:

1. An image processing method, comprising:
receiving an input image of sequential frames;
receiving a reference image corresponding to the input image;
estimating pixel-wise optical flow information based on the input image and the reference image;
estimating a term corresponding to temporal consistency between the frames of the input image;
determining a mesh based on the term corresponding to the temporal consistency and the optical flow information;
transforming the reference image based on the mesh; and
performing image blending based on the input image, the transformed reference image, and mask data indicating a hole comprised in the frames of the input image.

2. The image processing method of claim 1, wherein the determining of the mesh comprises:
determining positions of target points of the mesh from a combination of the term corresponding to the temporal consistency and the optical flow information, based on a first weight of the term corresponding to the temporal consistency and a second weight corresponding to the optical flow information.

3. The image processing method of claim 1, wherein the term corresponding to the temporal consistency is determined based on a position of the mesh in a previous frame.

4. The image processing method of claim 1, wherein the transforming of the reference image comprises:
obtaining a value of pixels comprised in the mesh from the reference image based on a geometrical structure of the mesh.

5. The image processing method of claim 1, wherein the performing of the image blending comprises:
obtaining a value of a pixel corresponding to the hole from the transformed reference image; and
determining a value of a pixel positioned near the hole based on a combination of the input image and the transformed reference image.

6. The image processing method of claim 1, further comprising:
extracting first feature points from the input image;
extracting second feature points from the reference image; and
performing preprocessing by matching the first feature points and the second feature points.

7. The image processing method of claim 6, wherein the performing of the preprocessing comprises:
removing a rotation between the input image and the reference image based on a result of the matching.

8. The image processing method of claim 6, wherein the performing of the preprocessing comprises:
estimating a color difference between the input image and the reference image based on a result of the matching,
wherein the transforming of the reference image comprises:
transforming the reference image based further on the color difference.

9. The image processing method of claim 8, wherein the transforming of the reference image based further on the color difference comprises:
determining a value of pixels comprised in the mesh based on the reference image and the color difference, according to a geometrical structure of the mesh.

10. The image processing method of claim 1, wherein the hole corresponds to a region removed from the input image.

11. The image processing method of claim 1, wherein the estimating of the optical flow information comprises:
estimating vectors indicating optical flows between pixels comprised in the input image and reference pixels comprised in the reference image that correspond to the pixels comprised in the input image.

12. The image processing method of claim 1, wherein the input image comprises 360-degree (°) panorama video data.

13. A non-transitory computer-readable storage medium storing instructions that are executable by a processor to perform the image processing method of claim 1.

14. An image processing device, comprising:
a receiver configured to receive an input image of sequential frames and receive a reference image corresponding to the input image;
a transformer configured to estimate pixel-wise optical flow information based on the input image and the reference image, estimate a term corresponding to temporal consistency between the frames of the input image, determine a mesh based on the term corresponding the temporal consistency and the optical flow information, and transform the reference image based on the mesh; and
an image blender configured to perform image blending based on the input image, the transformed reference image, and mask data indicating a hole comprised in the frames of the input image.

15. The image processing device of claim 14, wherein, for the determining of the mesh, the transformer is configured to:
determine positions of target points of the mesh from a combination of the term corresponding to the temporal consistency and the optical flow information, based on a first weight of the term corresponding to the temporal consistency and a second weight corresponding to the optical flow information.

16. The image processing device of claim 14, wherein, for the transforming of the reference image, the transformer is configured to:
obtain a value of pixels comprised in the mesh from the reference image based on a geometrical structure of the mesh.

17. The image processing device of claim 14, wherein the image blender is configured to:
obtain a value of a pixel corresponding to the hole from the transformed reference image, and determine a value of a pixel positioned near the hole based on a combination of the input image and the transformed reference image.

18. The image processing device of claim 14, wherein the hole corresponds to a region removed from the input image.

19. The image processing device of claim 14, wherein, for the estimating of the optical flow information, the transformer is configured to:
estimate vectors indicating optical flows between pixels comprised in the input image and reference pixels comprised in the reference image that correspond to the pixels comprised in the input image.

20. The image processing device of claim 14, wherein the input image comprises 360-degree (°) panorama video data.

* * * * *